US011249261B2

(12) United States Patent
Park et al.

(10) Patent No.: US 11,249,261 B2
(45) Date of Patent: Feb. 15, 2022

(54) OPTICAL MODULE AND OPTICAL COMMUNICATION NETWORK SYSTEM HAVING THE SAME

(71) Applicant: OPROCESSOR INC, Boston, MA (US)

(72) Inventors: Sahnggi Park, Boston, MA (US); Kyungeun Kim, Boston, MA (US)

(73) Assignee: OPROCESSOR INC, Boston, MA (US)

(*) Notice: Subject to any disclaimer, the term of this patent is extended or adjusted under 35 U.S.C. 154(b) by 156 days.

(21) Appl. No.: 16/556,802

(22) Filed: Aug. 30, 2019

(65) Prior Publication Data

US 2021/0063653 A1   Mar. 4, 2021

(51) Int. Cl.
  *G02B 6/42*  (2006.01)
  *G02B 6/293*  (2006.01)
  *H04J 14/02*  (2006.01)
  *H04B 10/27*  (2013.01)

(52) U.S. Cl.
  CPC ......... *G02B 6/4206* (2013.01); *G02B 6/2938* (2013.01); *G02B 6/29361* (2013.01); *G02B 6/42* (2013.01); *G02B 6/4215* (2013.01); *H04B 10/27* (2013.01); *H04J 14/02* (2013.01)

(58) Field of Classification Search
  CPC .......... G02B 6/4206; G02B 6/29361; G02B 6/4215; G02B 6/42; G02B 6/2938; G02B 6/34; G02B 6/4201; G02B 6/4204; G02B 6/4207; G02B 6/4208; G02B 6/4209; G02B 6/4212; G02B 6/4214; G02B 6/4239; G02B 6/12; G02B 6/12002; G02B 6/12004; G02B 6/12007; G02B 2006/12114; G02B 2006/12147
  See application file for complete search history.

(56) References Cited

U.S. PATENT DOCUMENTS

| | | | |
|---|---|---|---|
| 4,932,743 A | 6/1990 | Isobe et al. | |
| 5,066,086 A | 11/1991 | Angenent et al. | |
| 5,293,441 A | 3/1994 | Tanisawa | |
| 6,052,189 A | 4/2000 | Fuse et al. | |
| 6,987,906 B2 * | 1/2006 | Nakama | G02B 6/12004 385/15 |
| 7,511,529 B1 | 3/2009 | Dagher et al. | |
| 8,761,553 B2 | 6/2014 | Park et al. | |
| 9,031,365 B2 | 5/2015 | Park et al. | |
| 9,423,567 B2 | 8/2016 | Park | |
| 9,900,098 B2 | 2/2018 | Park et al. | |
| 2002/0009274 A1 | 1/2002 | Gharavi | |
| 2004/0096152 A1 | 5/2004 | Nakama et al. | |
| 2007/0030866 A1 | 2/2007 | Kim et al. | |
| 2008/0002753 A1 | 1/2008 | Timans | |
| 2010/0002987 A1 | 1/2010 | Hata et al. | |
| 2011/0075970 A1 | 3/2011 | Schrauwen et al. | |

* cited by examiner

*Primary Examiner* — John Bedtelyon
(74) *Attorney, Agent, or Firm* — Rabin & Berdo, P.C.

(57) ABSTRACT

The present invention includes a substrate, an optical waveguide on the substrate, a light source configured to provide light into the optical waveguide, and a prism between the light source and the optical waveguide. The light source includes a lens.

20 Claims, 11 Drawing Sheets

OPTICAL MODULE AND OPTICAL COMMUNICATION NETWORK SYSTEM HAVING THE SAME

BACKGROUND

The present disclosure relates to an optical module including a lens and an optical communication network system having the same.

With a decrease in size of electronic devices and an increase in operation speed thereof, researches have been continuously carried out to increase the degree of integration of components of electronic devices. Not only small size of components of electronic devices but also fast signal transfer between the components is required in order to achieve small size and high operation speed of the electronic devices.

To achieve fast signal transfer between components of electronic devices, attempts are being made to apply a technology for optical communication between electronic devices. When the optical communication technology is applied to electronic devices, signals may be transferred at a higher speed, and generation of high resistance and high heat, a parasitic capacitance phenomenon, and the like, which are disadvantages of typical signal transfer methods, may be reduced.

Researches are being actively carried out to apply, to computers, an optical fiber communication technology which is technically ready. Typically, a silicon photonics technology uses a silicon material as an optical waveguide to transmit optical signals. Furthermore, researches are being actively carried out to directly utilize an existing optical fiber communication technology by inserting an optical fiber into a PCB of a computer.

SUMMARY

The present disclosure provides an optical module capable of emitting parallel light from a light source and an optical communication network system having the same.

An embodiment of the inventive concept provides an optical module including: a substrate; an optical waveguide on the substrate; a light source configured to provide light into the optical waveguide; and a prism between the light source and the optical waveguide, wherein the light source includes a lens.

In an embodiment, the lens may include a base part having a shape of a flat plate and a semispherical protrusion part protruding from the base part toward the prism.

In an embodiment, the light source may include an adhesive layer covering the lens and a light transmission part on the adhesive layer.

In an embodiment, the light source may further include a light generation part configured to emit light toward the lens, and the lens may satisfy Equation (1) below.

$$F \cdot \tan(\tfrac{1}{2} \cdot \theta 2) < R \quad (1)$$

In an embodiment, a radius of the lens may be about 1 μm to about 100 μm.

In an embodiment, a refractive index of the lens may be about 1.55 to about 2.5, and a refractive index of the adhesive layer may be about 1.3 to about 1.55.

In an embodiment, the lens may include at least one of SiC, GaN, $Si_3N_4$, TiN, $LiNbO_3$, $TiO_2$, ZnSe, or polyimide.

In an embodiment, the optical module may further include an anti-reflection film covering a lower surface and an inclined plane of the prism.

In an embodiment, the light that has passed through the lens may be parallel light.

In an embodiment of the inventive concept, an optical module includes: a substrate; an optical waveguide on the substrate; a filter on the optical waveguide; a prism on the filter; and a light source on an inclined plane of the prism.

In an embodiment, the filter may be a wavelength division multiplexing filter.

In an embodiment, the filter may include an upper mirror, a lower mirror, and a spacer between the upper mirror and the lower mirror.

In an embodiment, a length of a path through which light emitted from the light source passes in the upper mirror, a length of a path through which the light passes in the spacer, and a length of a path through which the light passes in the lower mirror may be integer multiples of a half wavelength of the light.

In an embodiment, the upper mirror and the lower mirror may be symmetric with respect to the spacer.

In an embodiment, the optical module may further include: a buffer layer between the filter and the optical waveguide, wherein the upper mirror may include a first filter film which is in contact with the prism and a second filter film which is in contact with the spacer, and the lower mirror may include a third filter film which is in contact with the spacer and a fourth filter film which is in contact with the buffer layer, wherein the first filter film and the fourth filter film may have the same thickness and refractive index, and the second filter film and the third filter film may have the same thickness and refractive index.

In an embodiment, a refractive index of the spacer may be equal to the refractive index of the first filter film.

In an embodiment of the inventive concept, an optical communication network system includes: a substrate having a sub control region, a connection region, and a sub unit cell region; a first light source and a first detector in the sub control region; a second light source and a second detector in the sub unit cell region; a first optical waveguide connecting the first light source and the second detector and a second optical waveguide connecting the second light source and the first detector; and a first prism between the first light source and the first optical waveguide and a second prism between the second light source and the second optical waveguide.

In an embodiment, the optical communication network system may further include a first filter between the first prism and the first optical waveguide and a second filter between the second prism and the second optical waveguide.

In an embodiment, the optical communication network system may further include anti-reflection films covering a lower surface and an inclined plane of each of the first and second prisms.

In an embodiment, each of the first light source and the second light source may include a lens.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by the scope of claims. Like reference numerals refer to like elements throughout.

The terminology used herein is not for delimiting the embodiments of the inventive concept but for describing the embodiments. The terms of a singular form may include plural forms unless otherwise specified. It will be further understood that the terms "include", "including", "comprise", and/or "comprising" used herein specify the presence of stated elements, steps, operations, and/or devices, but do not preclude the presence or addition of one or more other elements, steps, operations, and/or devices. Hereinafter, embodiments of the inventive concept will be described in detail with reference to the accompanying drawings.

Figure 1:
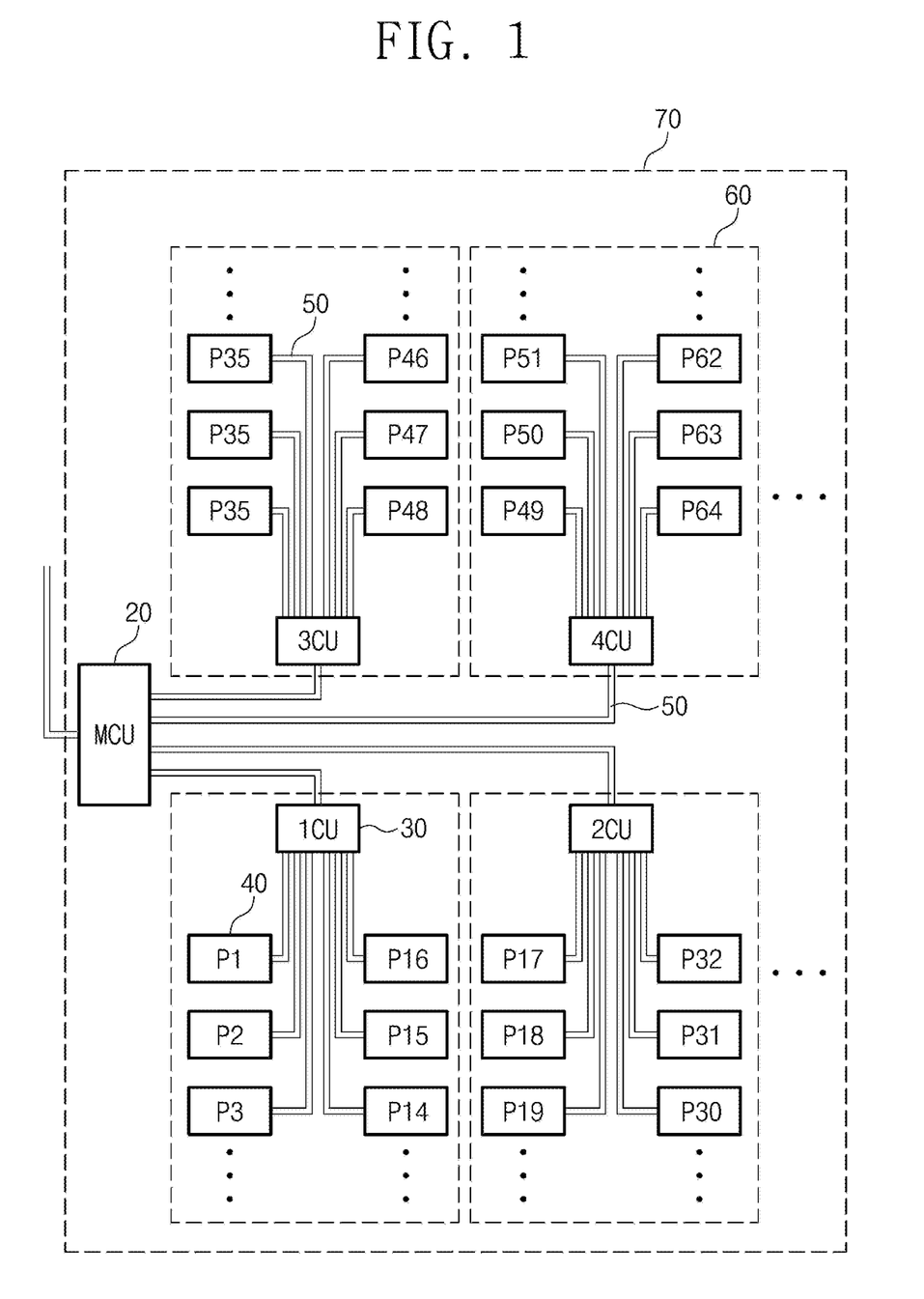
FIG. 1 is a diagram for schematically describing an optical communication network system according to an embodiment of the inventive concept.

FIG. 1 is a diagram for schematically describing an optical communication network system according to an embodiment of the inventive concept.

Referring to FIG. 1, the optical communication network system according to an embodiment of the inventive concept may include main control parts 20, sub control parts 30, sub unit cell parts 40, and optical waveguides 50. The optical waveguides 50 may connect the main control parts 20, the sub control parts 30, and the sub unit cell parts 40. The main control parts 20 may output a control signal for controlling the sub control parts 30 and the sub unit cell parts 40, and may receive a response signal. The sub control parts 30 may communicate with the main control parts 20, and may control the sub unit cell parts 40. One sub control part 30 and 16 sub unit cell parts 40 may constitute each of unit cell parts 60. When the unit cell parts 60 include 16 unit cell parts, the unit cell parts 60 may include 16 sub unit cell parts 40. Furthermore, one main control part 20 and 16 unit cell parts 60 may constitute upper unit cells 70. Although not illustrated, 16 upper unit cell 70 may include 163 sub unit cell parts 40. The upper unit cell 70 and super main control parts (not shown) may constitute a high-dimensional unit cell. Therefore, the optical communication network system of an embodiment of the inventive concept may include the sub unit cell parts 40, the number of which becomes 16 to the power of a larger number as the dimension of the unit cell parts 60 increases.

The sub control parts 30 may determine whether to output optical signals of the sub unit cell parts 40 to other sub unit cell parts 40 in the unit cell part 60 of the same group, other unit cell parts 60 or the upper unit cell 70. Each of the main control parts 20, the sub control parts 30, and the sub unit cell parts 40 may perform photoelectric conversion between an optical signal and an electric signal.

Figure 2:
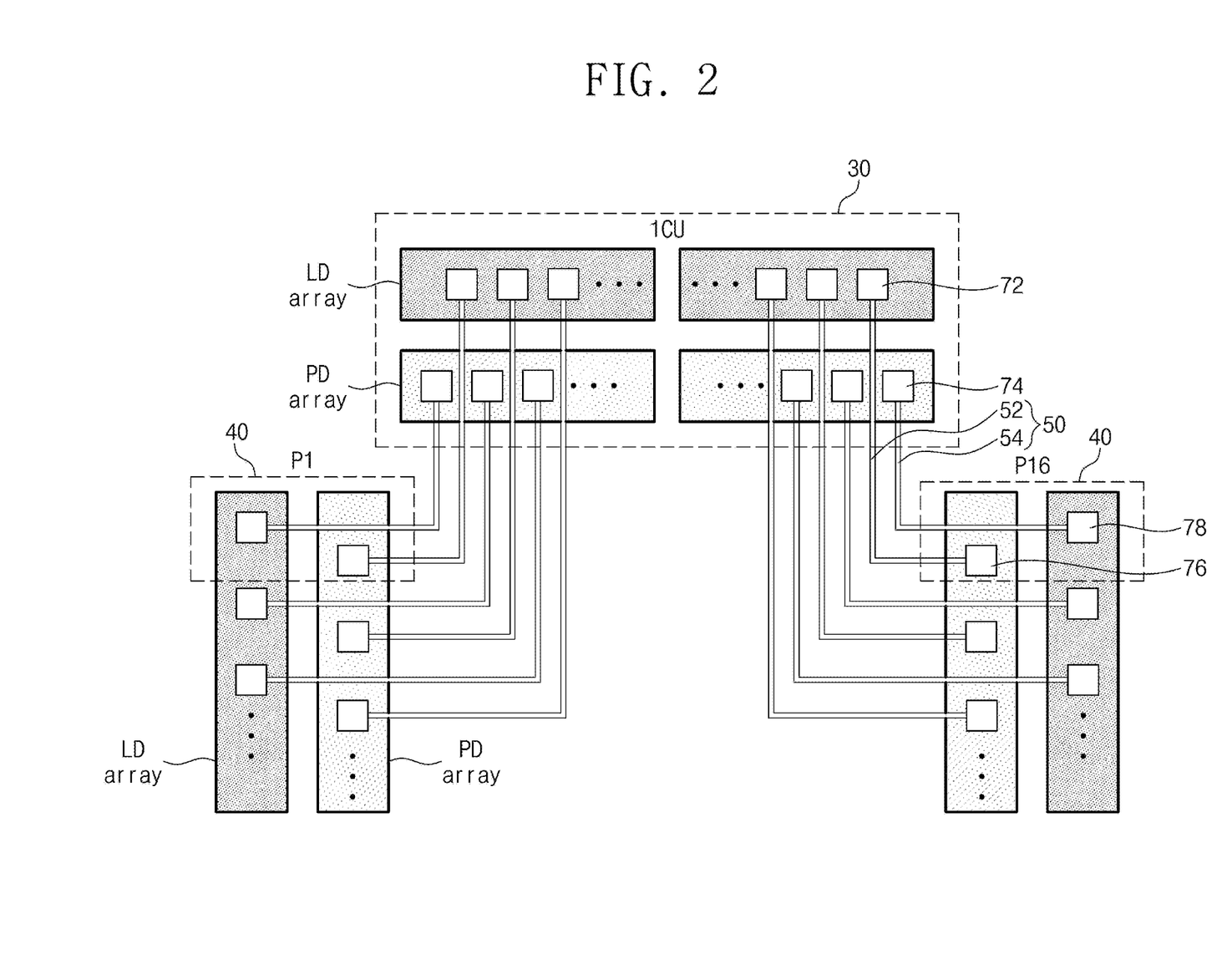
FIG. 2 is a diagram for describing in more detail sub control parts and sub unit cell parts.

FIG. 2 is a diagram for describing in more detail sub control parts and sub unit cell parts.

Referring to FIGS. 1 and 2, the sub control parts 30 may include light emitting arrays LD and light receiving arrays PD. The light emitting array LD of the sub control parts 30 may include first light sources 72, and the light receiving array PD may include first detectors 74. The sub unit cell parts 40 may include a portion of the light emitting array LD and a portion of the light receiving array PD. The sub unit cell parts 40 may include a second light source 78 and a second detector 76. The first light source 72 and the second light source 78 may include a vertical cavity surface emitting laser (VCSEL) or laser diode. The first detector 74 and the second detector 76 may include a photodiode. The first detector 74 and the second detector 76 may be connected by a first optical waveguide 52. The first light source 72, the first optical waveguide 52, and the second detector 76 may establish a first communication line. Furthermore, a second optical waveguide 54 may connect the first detector 74 and the second light source 78. Likewise, the first detector 74, the second optical waveguide 54, and the second light source 78 may establish a second communication line. The first optical waveguide 52 and the second optical waveguide 54 may connect the sub control parts 30 and the sub unit cell parts 40 without intersecting with each other.

The first light source 72, the first detector 74, the second light source 78, and the second detector 76 are optical elements. The optical elements may be combined with optical waveguides so as to constitute an optical module. The optical waveguide 50 may connect optical modules. The sub unit cell parts 40 may have a plurality of optical modules for transmitting/receiving optical signals.

An optical module for maximizing optical coupling efficiency is described below in relation to an embodiment.

Figure 3:
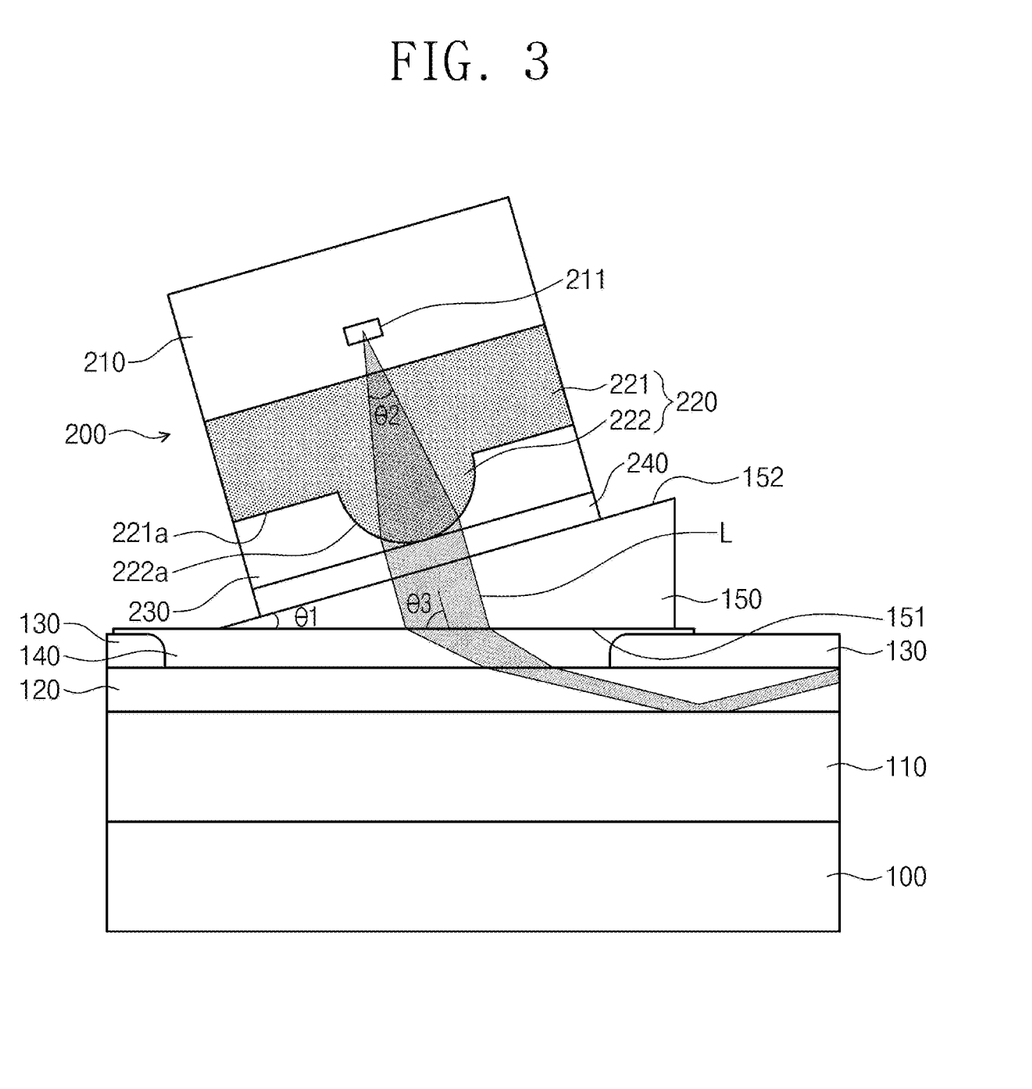
FIG. 3 is a cross-sectional view of an optical module according to an embodiment of the inventive concept.

FIG. 3 is a cross-sectional view of an optical module according to an embodiment of the inventive concept.

Referring to FIG. 3, the optical module may include a substrate 100, a lower clad layer 110, an optical waveguide 120, an upper clad layer 130, a buffer layer 140, a prism 150, and a light source 200.

The substrate 100 may include crystalline silicon. The crystalline silicon may have a refractive index of about 3.45. Although not illustrated, the substrate 100 may have a sub control region, a connection region, and a sub unit cell region. The sub control region may correspond to the sub control parts 30 of FIGS. 1 and 2. The sub unit cell region may correspond to the sub unit cell parts 40 of FIGS. 1 and 2. The connection region may be a region between the sub control region and the sub unit cell region.

The lower clad layer 110 may be provided on the substrate 100. The lower clad layer 110 may include silicon oxide. The silicon oxide may have a refractive index of about 1.45.

The optical waveguide 120 may be provided on the lower clad layer 110. The lower clad layer 110 may have a lower refractive index than that of the optical waveguide 120. The optical waveguide 120 may have a lower refractive index than that of the substrate 100. The optical waveguide 120 may include silicon nitride or silicon oxynitride. The silicon nitride may have a refractive index of about 2.0. The silicon oxynitride may have a refractive index of about 1.45 to about 2.0. The optical waveguide 120 may correspond to the optical waveguide 50 of FIGS. 1 and 2.

An upper surface of the optical waveguide 120 may be divided into a first part and a second part. The upper clad layer 130 may cover the first part of the upper surface of the optical waveguide 120. The upper clad layer 130 may expose the second part of the upper surface of the optical waveguide 120. The refractive index of the upper clad layer 130 may be lower than the refractive index of the optical waveguide 120. The upper clad layer 130 may include silicon oxide.

The buffer layer 140 may cover the second part of the upper surface of the optical waveguide 120. That is, the buffer layer 140 may cover the upper surface of the optical waveguide 120 exposed by the upper clad layer 130. The buffer layer 140 may have a higher refractive index than that of the optical waveguide 120. The buffer layer 140 may include an index matching oil or adhesive having a refractive index of about 1.7 to about 2.1.

The prism 150 may be disposed on the buffer layer 140. A lower surface 151 of the prism 150 may be in contact with the buffer layer 140. The buffer layer 140 may prevent air from flowing to a gap between the prism 150 and the optical waveguide 120. In cases when air flows into a gap between the prism 150 and the optical waveguide 120, efficiency of optical transfer between the prism 150 and the optical waveguide 120 may deteriorate. The prism 150 may have a higher refractive index than that of the buffer layer 140. The prism 150 may have a wedge shape with an inclined plane 152. An inclination angle of the prism 150 may be defined as a first angle $\theta 1$. The prism 150 may include crystalline silicon or gallium phosphide (GaP). The gallium phosphide may have a refractive index of about 3.16.

The light source 200 may be in contact with the inclined plane 152 of the prism 150. The light source 200 of the present embodiment may correspond to the first light source 72 or the second light source 78 of FIGS. 1 and 2. Instead of the light source 200, a detector corresponding to the first detector 74 or the second detector 76 of FIGS. 1 and 2 may be provided.

The light source 200 may provide laser light L to the optical waveguide 120. The light source 200 may include a light generation part 210, a lens 220, an adhesive layer 230, and a light transmission part 240.

The light generation part 210 may generate and emit the laser light L. The light generation part 210 may be a vertical cavity surface emitting laser (VCSEL) or laser diode. The laser light L emitted from the light generation part 210 may have a second angle $\theta 2$ as a radiation angle. For example, the second angle $\theta 2$ may be about 10 degrees to about 30 degrees. The light generation part 210 may include an opening 211, and the laser light L may be emitted from the opening 211.

The lens 220 may be provided on the light generation part 210. The lens 220 may include a base part 221 and a protrusion part 222. The base part 221 may have a shape of a flat plate. The protrusion part 222 may have a semispherical shape. The base part 221 may be provided on the light generation part 210, and the protrusion part 222 may protrude from the base part 221 toward the prism 150. The lens 220 may have a refractive index of about 1.55 to about 2.5. The lens 220 may include at least one of SiC, GaN, Si3N4, TiN, LiNbO3, TiO2, ZnSe, or polyimide. A radius of the protrusion part 222 of the lens 220 may be about 1 μm to about 100 μm.

The adhesive layer 230 may be provided on the lens 220. The adhesive layer 230 may cover the lens 220. In other words, the adhesive layer 230 may cover an upper surface 221a of the base part 221 of the lens 220 and an upper surface 222a of the protrusion part 222 of the lens 220. The adhesive layer 230 may have a refractive index of about 1.3 to about 1.55. The adhesive layer 230 may include an optical adhesive.

The light transmission part 240 may be provided on the adhesive layer 230. The light transmission part 240 may include glass or quarts. Although the light transmission part 240 is illustrated as being in contact with the protrusion part 222 of the lens 220, an embodiment of the inventive concept is not limited thereto. In other words, the light transmission part 240 may be spaced apart from the protrusion part 222 of the lens 220 by the adhesive layer 230.

Operation of the optical module according to an embodiment of the inventive concept is described below. The laser light L generated by the light generation part 210 of the light source 200 may pass through the lens 220 and the adhesive layer 230. While passing through the lens 220 and the adhesive layer 230, the radiation angle of the laser light L may decrease. Accordingly, the laser light L passing through the light transmission part 240 may be parallel light. That is, the radiation angle of the laser light L passing through the light transmission part 240 may be about 0 degree.

The laser light L that has passed through the light transmission part 240 may be perpendicularly incident on the inclined plane 152 of the prism 150, and may pass through the prism 150. The laser light L passing through the prism 150 may form a third angle $\theta 3$ with the lower surface 151 of the prism 150. The third angle $\theta 3$ may correspond to the inclination angle of the prism 150. In other words, a sum of the first angle $\theta 1$ and the third angle $\theta 3$ may be about 90 degrees.

The laser light L that has passed through the prism 150 may pass through the buffer layer 140 and may be incident into the optical waveguide 120. The laser light L that has been incident into the optical waveguide 120 may be reflected by the lower clad layer 110 and the upper clad layer 130, and may travel along the optical waveguide 120.

If the light passing through the light transmission part 240 of the light source 200 is not parallel light, a portion of the laser light L may not be coupled on the optical waveguide 120 after passing through the prism 150 and the buffer layer 140. For example, when the radiation angle of the laser light L passing through the light transmission part 240 is larger than about 2 degrees, a considerable portion of the laser light L may not be coupled on the optical waveguide 120. According to an embodiment of the inventive concept, the laser light L may be coupled on the optical waveguide 120 by rendering the laser light L emitted from the light source 200 parallel.

A method for manufacturing the optical module according to an embodiment of the inventive concept is described below. The adhesive layer 230 may be formed on the lens 220, and the light transmission part 240 may be attached to the adhesive layer 230. Thereafter, the lens 220 may be attached to the light generation part 210 to manufacture the light source 200. Thereafter, manufacturing of the optical module may be completed by attaching the light source 200 to the prism 150 and attaching the prism 150 to the buffer layer 140.

Figure 4:
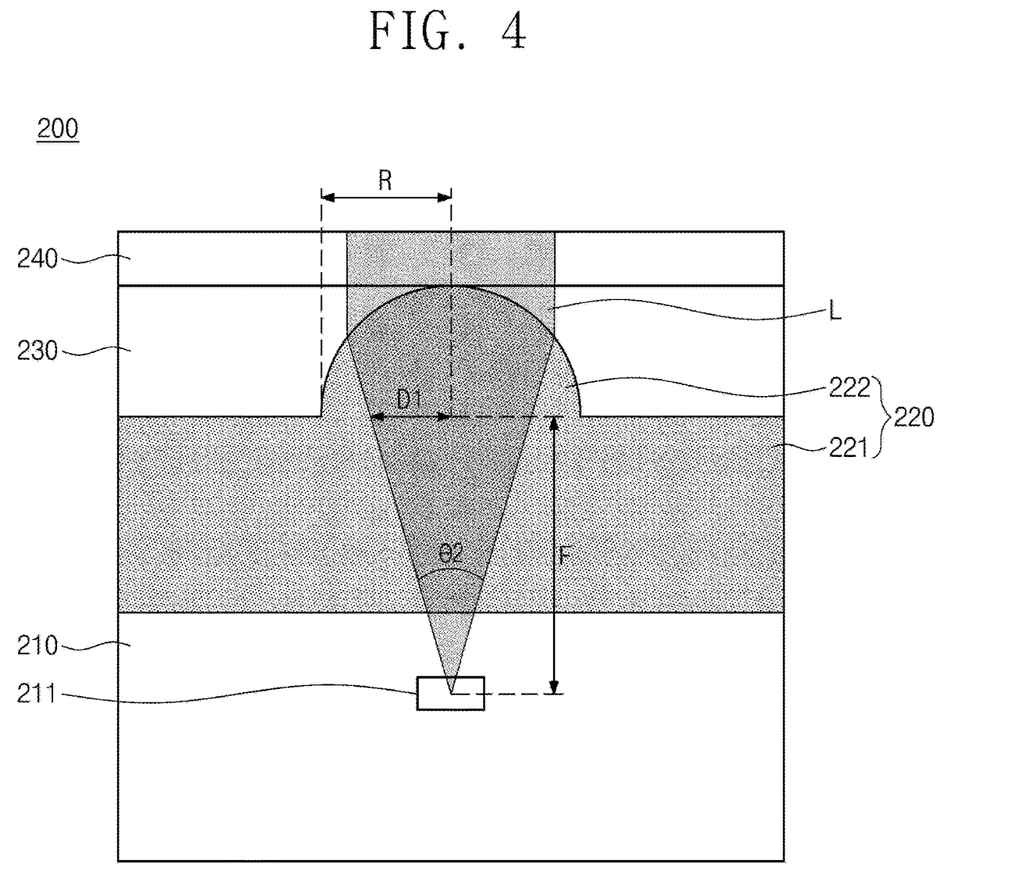
FIG. 4 is a cross for describing a condition for emitting parallel light from the light source of FIG. 3.

FIG. 4 is a diagram for describing a condition for emitting parallel light from the light source of FIG. 3.

Referring to FIG. 4, the laser light L emitted from the light generation part 210 of the light source 200 may have the second angle θ2 as the radiation angle. The second angle θ2 may be about 10 degrees to about 30 degrees. The laser light L passing through the light transmission part 240 of the light source 200 may be parallel light. That is, the radiation angle of the laser light L passing through the light transmission part 240 of the light source 200 may be about 0 degree.

It is required to satisfy a condition according to following Equation (1) so that the laser light L passing through the light transmission part 240 is parallel light.

$$D1 = F \cdot \tan(\tfrac{1}{2} \cdot \theta2) < R \qquad (1)$$

In Equation (1), F denotes a focal distance of the protrusion part 222 of the lens 220, R denotes a radius of the protrusion part 222 of the lens 220, and θ2 denotes the radiation angle (second angle) of the laser light L emitted from the light generation part 210. In Equation (1), a first distance D1 may be defined by the focal distance F and the second angle θ2.

The focal distance F of the protrusion part 222 of the lens 220 may be derived by Equation (2) as below.

$$F = R \cdot n1/(n1 - n2) \qquad (2)$$

In Equation (2), n1 denotes the refractive index of the lens 220, and n2 denotes the refractive index of the adhesive layer 230.

When the first distance D1 is smaller than the radius R of the protrusion part 222 of the lens 220, satisfying the condition according to Equation (1), the laser light L passing through the light transmission part 240 may be parallel. When the first distance D1 is larger than the radius R of the protrusion part 222 of the lens 220 and thus the condition according to Equation (1) is not satisfied, the laser light L passing through the light transmission part 240 may not be parallel.

Referring to Equations (1) and (2), the condition according to Equation (1) may be satisfied by appropriately setting the radius R of the protrusion part 222 of the lens 220, the refractive index n1 of the lens 220, and the refractive index n2 of the adhesive layer 230. For example, when the second angle θ2 is about 30 degrees, the refractive index n2 of the adhesive layer 230 is about 1.46, and the radius R of the protrusion part 222 of the lens 220 is about 15 μm, the laser light L passing through the light transmission part 20 may be parallel when the refractive index n1 of the lens 220 is set to at least about 1.72. When the lens 220 includes polyimide, the refractive index n1 may be about 1.72.

The radius R of the protrusion part 222 of the lens 220 may be about 1 μm to about 100 μm, the refractive index n1 of the lens 220 may be about 1.65 to about 2.5, and the refractive index n2 of the adhesive layer 230 may be about 1.3 to about 1.55.

Figure 5:
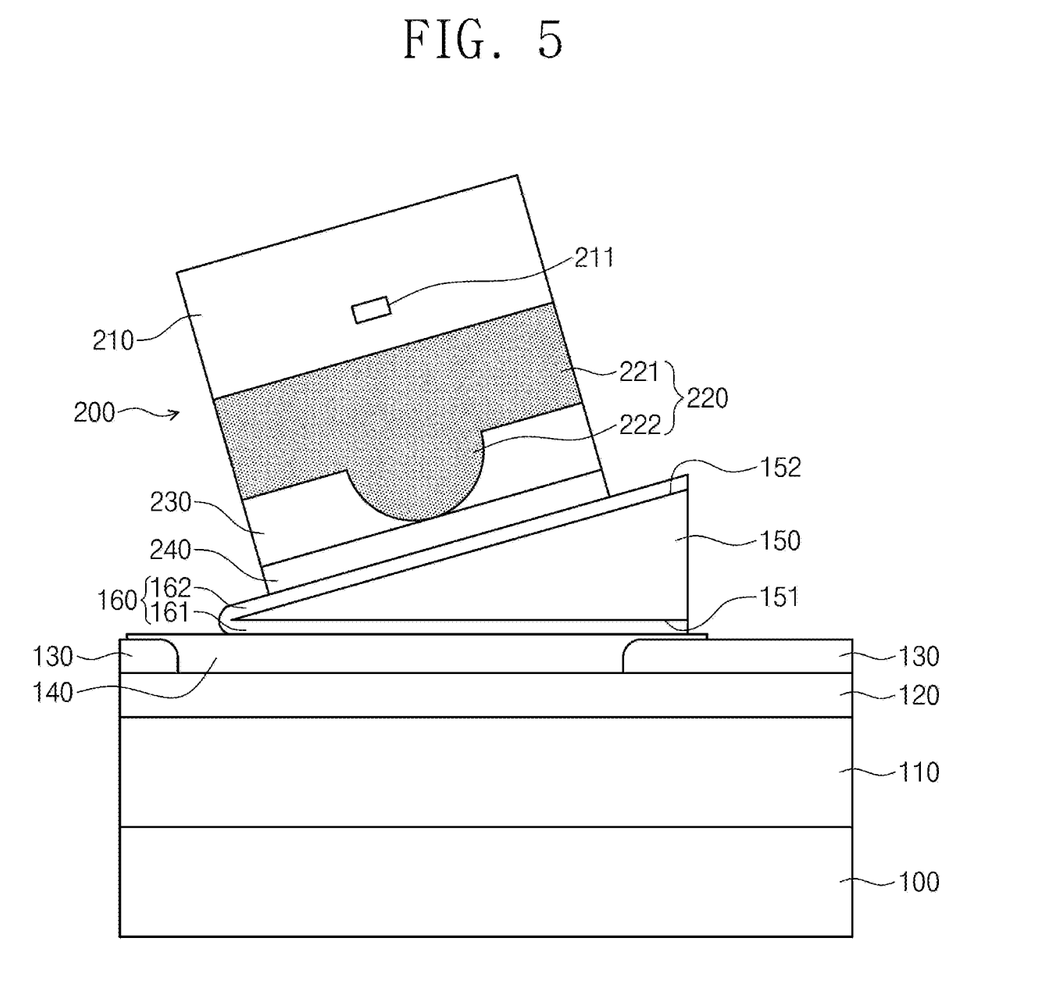
FIG. 5 is a cross-sectional view of an optical module according to an embodiment of the inventive concept.

FIG. 5 is a cross-sectional view of an optical module according to an embodiment of the inventive concept. The optical module according to the present embodiment is different from the optical module of FIG. 3 as described below, but is otherwise similar to the optical module of FIG. 3.

Referring to FIG. 5, the optical module may further include an anti-reflection film 160. The anti-reflection film 160 may include a first part 161 and a second part 162.

The first part 161 of the anti-reflection film 160 may be provided on the lower surface 151 of the prism 150. The second part 162 of the anti-reflection film 160 may be provided on the inclined plane 152 of the prism 150. A thickness of the first part 161 may be substantially equal to a thickness of the second part 162. In other words, the anti-reflection film 160 may conformally cover the lower surface 151 and the inclined plane 152 of the prism 150.

The anti-reflection film 160 may include first anti-reflection films and second anti-reflection films laminated alternately. The thickness of the first anti-reflection films may be different from the thicknesses of the second anti-reflection films. Materials included in the first anti-reflection films may be different from materials included in the second anti-reflection films. The refractive index of the first anti-reflection films may be different from the refractive index of the second anti-reflection films.

The prism 150 and the buffer layer 140 may be spaced apart from each other with the first part 161 of the anti-reflection film 160 therebetween. The prism 150 and the light transmission part 240 of the light source 200 may be spaced apart from each other with the second part 162 of the anti-reflection film 160 therebetween.

Figure 6A:
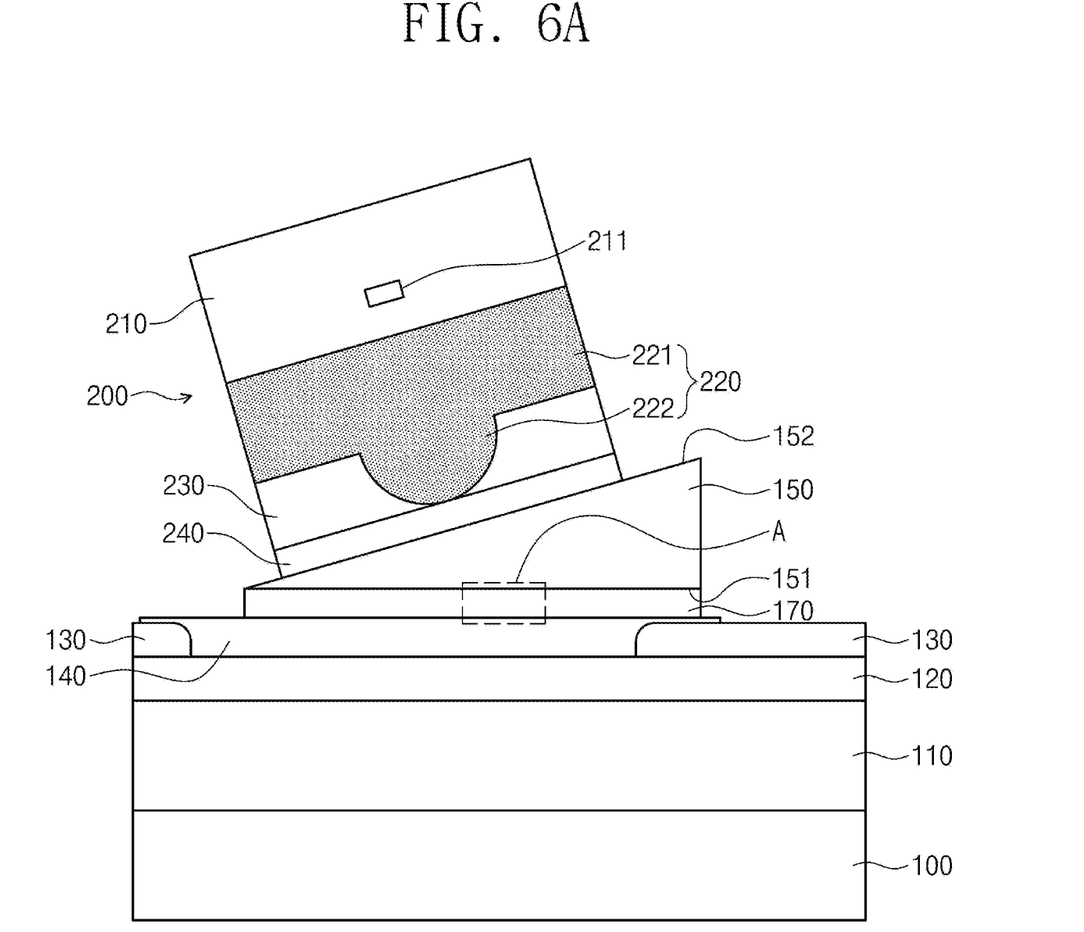
FIG. 6A is a cross-sectional view of an optical module according to an embodiment of the inventive concept.
Figure 6B:
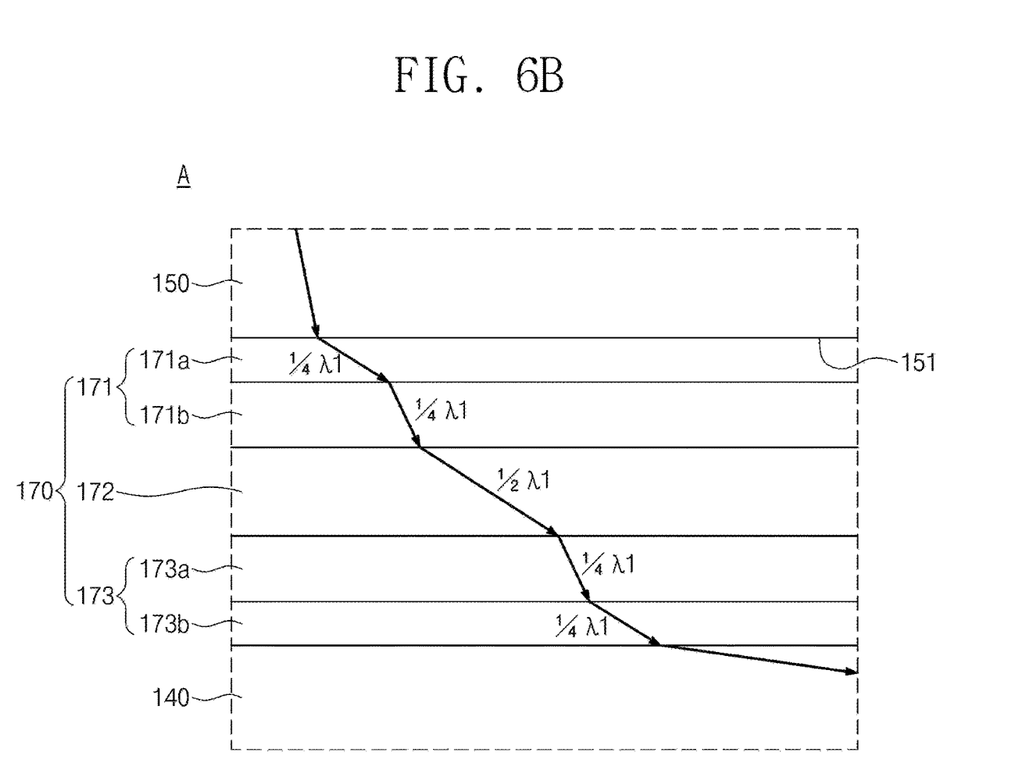
FIG. 6B is an enlarged view of the region A of FIG. 6A.

FIG. 6A is a cross-sectional view of an optical module according to an embodiment of the inventive concept. FIG. 6B is an enlarged view of the region A of FIG. 6A. The optical module according to the present embodiment is different from the optical module of FIG. 3 as described below, but is otherwise similar to the optical module of FIG. 3.

Referring to FIGS. 6A and 6B, the optical module may further include a filter 170. The filter 170 may be a wavelength division multiplexing (WDM) filter. The filter 170 may be provided on the lower surface 151 of the prism 150. The prism 150 and the buffer layer 140 may be spaced apart from each other with the filter 170 therebetween.

The filter 170 may include an upper mirror 171, a spacer 172, and a lower mirror 173. The spacer 172 may be disposed between the upper mirror 171 and the lower mirror 173. The upper mirror 171 may be in contact with the lower surface 151 of the prism 150. The lower mirror 173 may be in contact with the upper surface of the buffer layer 140.

The upper mirror 171 may include a pair of a first filter film 171a and second filter film 171b. The first and second filter films 171a and 171b may include different materials. For example, the first filter film 171a may include TiO₂, and the second filter film 171b may include Ta₂O₅. The first and second filter films 171a and 171b may have different refractive indices. The first and second filter films 171a and 171b may have different thicknesses. The first filter film 171a may be in contact with the prism 150, and the second filter film 171b may be in contact with the spacer 172.

Although the upper mirror 171 is illustrated as including a single pair of first filter film 171a and second filter film 171b, an embodiment of the inventive concept is not limited thereto. The upper mirror 171 may include a plurality of pairs of first filter film 171a and second filter film 171b. In this case, the first filter films 171a and the second filter films 171b may be alternately arranged.

The spacer 172 may include the same material as the first filter film 171a.

The lower mirror 173 may include a third filter film 173a and a fourth filter film 173b. The third and fourth filter films 173a and 173b may include different materials. The third filter film 173a may include the same material as the second filter film 171b of the upper mirror 171. The fourth filter film 173b may include the same material as the first filter film 171a of the upper mirror 171. The third and fourth filter films 173a and 173b may have different thicknesses. The thickness of the third filter film 173a may be equal to the thickness of the second filter film 171b of the upper mirror 171. The thickness of the fourth filter film 173b may be equal to the thickness of the first filter film 171a of the upper mirror 171. The third filter film 173a may be in contact with the spacer 172, and the fourth filter film 173b may be in contact with the buffer layer 140.

Although the lower mirror 173 is illustrated as including a single pair of third filter film 173a and fourth filter film 173b, an embodiment of the inventive concept is not limited thereto. The lower mirror 173 may include a plurality of pairs of third filter film 173a and fourth filter film 173b. In this case, the third filter films 173a and the fourth filter films 173b may be alternately arranged.

The upper mirror 171 and the lower mirror 173 may be symmetric with respect to the spacer 172.

The filter 170 may pass laser light of a specific wavelength. Referring to FIG. 6B, for example, the filter 170 may pass laser light of a first wavelength $\lambda 1$, and may reflect laser light of a wavelength different from the first wavelength $\lambda 1$. Once the laser light of the first wavelength $\lambda 1$ is transmitted through the prism 150 and is incident on the filter 170, the laser light may pass through the upper mirror 171, the spacer 172, and the lower mirror 173. The laser light may be refracted while passing through the upper mirror 171, the spacer 172, and the lower mirror 173.

In the first filter film 171a of the upper mirror 171, a length of a path through which the laser light passes may be one fourth of the first wavelength $\lambda 1$. In the second filter film 171b of the upper mirror 171, a length of a path through which the laser light passes may be one fourth of the first wavelength $\lambda 1$. The refractive indices and thicknesses of the first filter film 171a and the second filter film 171b may be determined so that the length of a path through which the laser light passes is one fourth of the first wavelength $\lambda 1$. As a result, in the upper mirror 171, a length of a path through which the laser light passes may be half of the first wavelength $\lambda 1$.

In cases when the upper mirror 171 includes, for example, two pairs of first filter film 171a and second filter film 171b unlike the illustration, the length of a path through which the laser light passes in the upper mirror 171 may be equal to the first wavelength $\lambda 1$.

For another example, in cases when the upper mirror 171 includes three pairs of first filter film 171a and second filter film 171b, the length of a path through which the laser light passes in the upper mirror 171 may be 3/2 times the first wavelength $\lambda 1$.

As described above, the length of a path through which the laser light passes in the upper mirror 171 may be an integer multiple of a half wavelength of the first wavelength $\lambda 1$.

In the spacer 172, the length of a path through which the laser light passes may be half of the first wavelength $\lambda 1$.

The length of a path through which the laser light passes in the spacer 172 may be equal to the first wavelength $\lambda 1$ unlike the illustration.

For another example, the length of a path through which the laser light passes in the spacer 172 may be 3/2 times the first wavelength $\lambda 1$.

As described above, the length of a path through which the laser light passes in the spacer 172 may be an integer multiple of a half wavelength of the first wavelength $\lambda 1$.

The refractive index and thickness of the spacer 172 may be determined so that the length of a path through which the laser light passes is an integer multiple of a half wavelength of the first wavelength $\lambda 1$.

In the third filter film 173a of the lower mirror 173a, the length of a path through which the laser light passes may be one fourth of the first wavelength $\lambda 1$. In the fourth filter film 173b of the lower mirror 173, the length of a path through which the laser light passes may be one fourth of the first wavelength $\lambda 1$. The refractive indices and thicknesses of the third filter film 173a and the fourth filter film 173b may be determined so that the length of a path through which the laser light passes is one fourth of the first wavelength $\lambda 1$. As a result, the length of a path through which the laser light passes in the lower mirror 173 may be half of the first wavelength $\lambda 1$.

In cases when the lower mirror 173 includes, for example, two pairs of third filter film 173a and fourth filter film 173b unlike the illustration, the length of a path through which the laser light passes may be equal to the first wavelength $\lambda 1$.

For another example, in cases when the lower mirror 173 includes three pairs of third filter film 173a and fourth filter film 173b, the length of a path through which the laser light passes in the lower mirror 173 may be 3/2 times the first wavelength $\lambda 1$.

As described above, the length of a path through which the laser light passes in the lower mirror 173 may be an integer multiple of a half wavelength of the first wavelength $\lambda 1$.

The filter 170 having the above-mentioned exemplary structure may pass laser light of the first wavelength $\lambda 1$, and may reflect laser light of a wavelength different from the first wavelength $\lambda 1$.

Figure 7A:
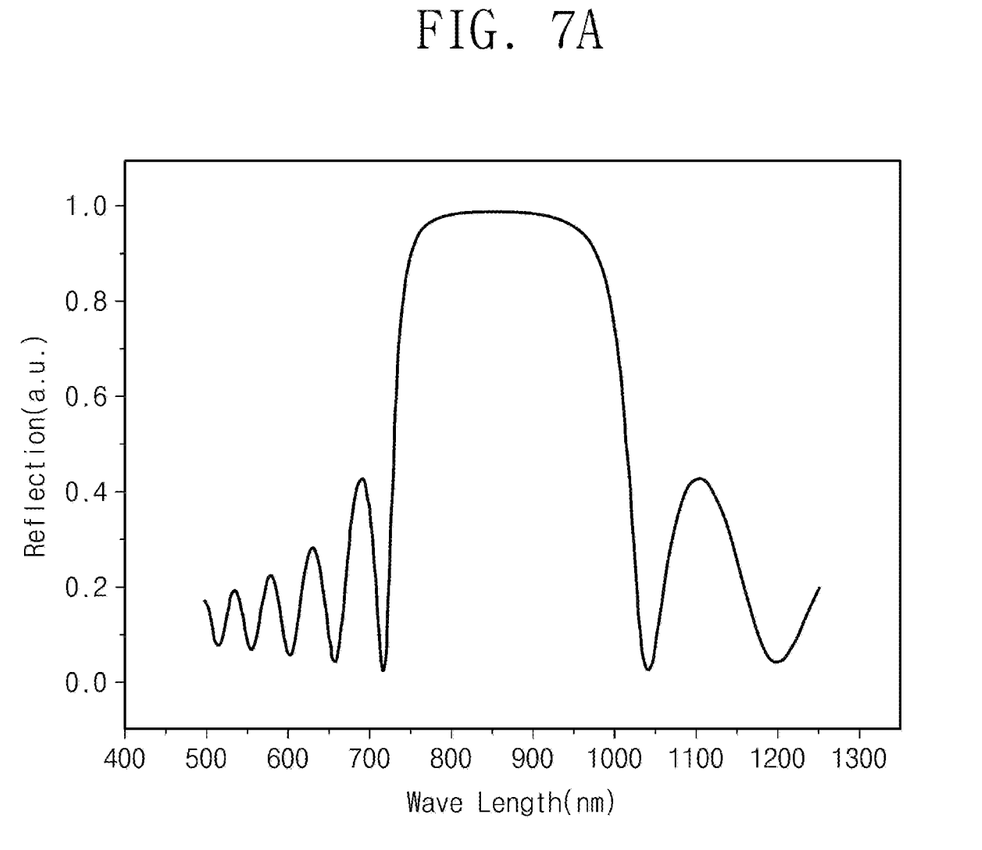
FIG. 7A is a graph illustrating reflectance of a mirror.
Figure 7B:
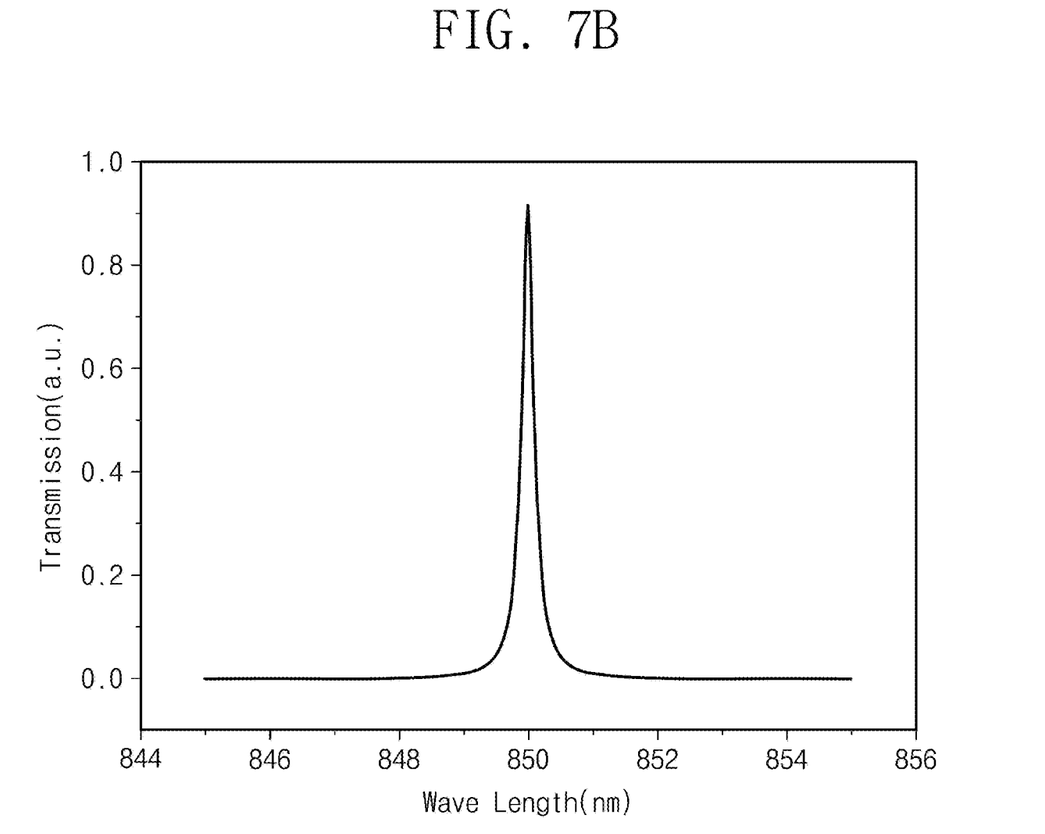
FIG. 7B is a graph illustrating transmittance of a filter using the mirror of FIG. 7A.

FIG. 7A is a graph illustrating reflectance of a mirror. FIG. 7B is a graph illustrating transmittance of a filter using the mirror of FIG. 7A.

The reflectance of the mirror (upper mirror or lower mirror) including eight pairs of the first filter film and second filter film when laser light is incident on the mirror may be recognized from FIG. 7A. The refractive indices and thicknesses of the first filter film and the second filter film of the mirror are determined so that the length of a path through which the laser light passes in the first filter film and second filter film is one fourth of 850 nm. It may be recognized from FIG. 7A that the laser light has relatively high reflectance before and after about 850 nm.

The transmittance of the filter including the mirror of FIG. 7A as an upper mirror and a lower mirror when laser light is incident on the filter may be recognized from FIG. 7B. The filter is configured such that the length of a path through which the laser light passes in the upper mirror is four times 850 nm, the length of a path through which the laser light passes in the spacer is four times 850 nm, and the length of a path through which the laser light passes in the lower mirror is four times 850 nm. It may be recognized that the transmittance is relatively high at about 850 nm.

Figure 8:
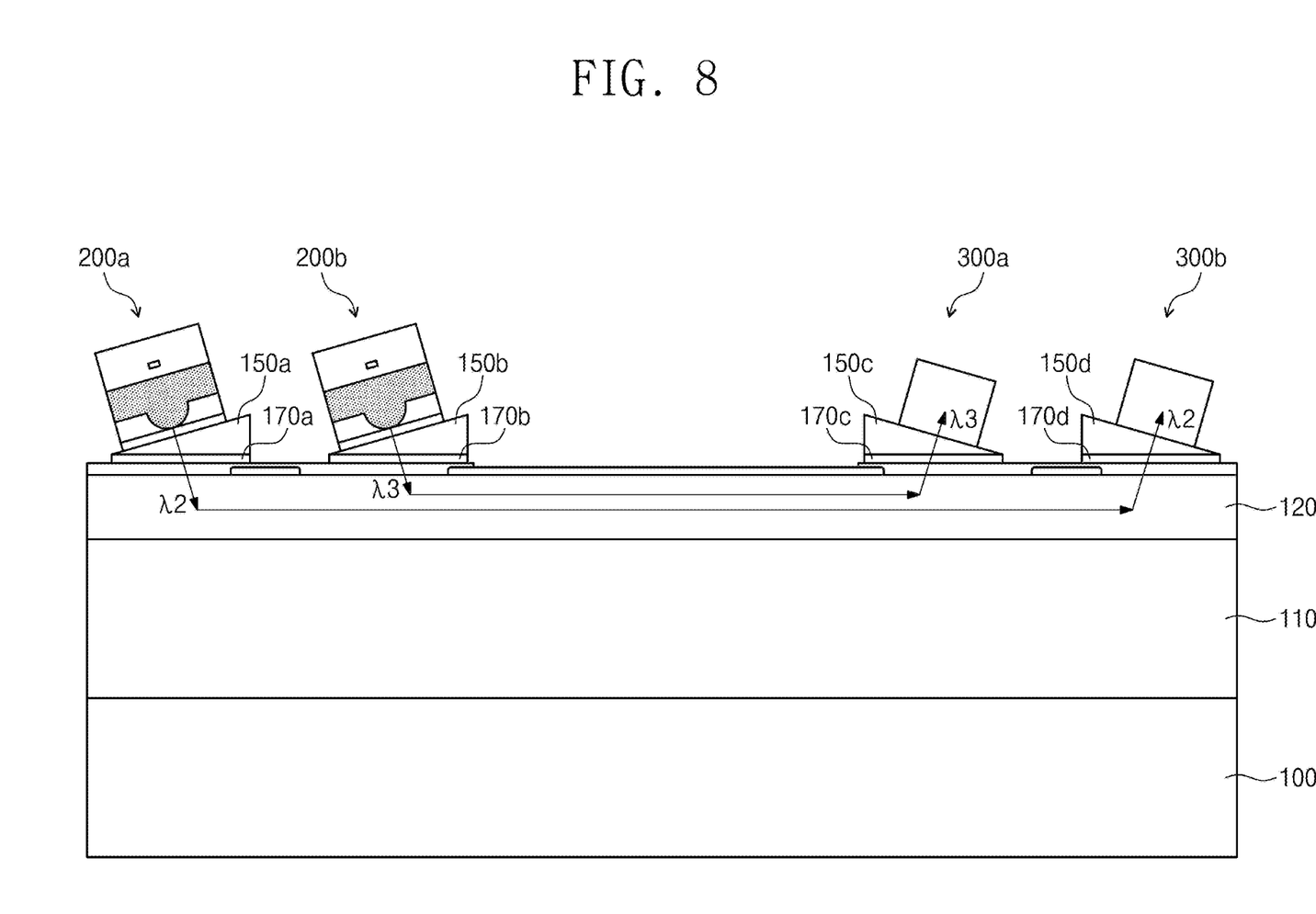
FIG. 8 is a diagram for describing a function of an optical module including a filter.

FIG. 8 is a diagram for describing a function of an optical module including a filter.

Referring to FIG. 8, in the optical module according to the present embodiment, first to fourth prisms 150a, 150b, 150c, and 150d may be provided on the optical waveguide 120. The first to fourth prisms 150a, 150b, 150c, and 150d may be connected to the optical waveguide 120 via the buffer layers 140. A first filter 170a may be provided under the first prism 150a, a second filter 170b may be provided under the second prism 150b, a third filter 170c may be provided under the third prism 150c, and a fourth filter 170d may be provided under the fourth prism 150d. The first and fourth filters 170a and 170d may pass laser light of a second wavelength $\lambda 2$, and may reflect laser light of a wavelength different from the second wavelength $\lambda 2$. The second and third filters 170b and 170c may pass laser light of a third wavelength λ3, and may reflect laser light of a wavelength different from the third wavelength λ3.

A first light source 200a may be provided on the first prism 150a, a second light source 200b may be provided on the second prism 150b, a first detector 300a may be provided on the third prism 150c, and a second detector 300b may be provided on the fourth prism 150d.

Laser light of the second wavelength λ2 may be emitted from the first light source 200a. The first filter 170a may pass the laser light of the second wavelength λ2. The laser light of the second wavelength λ2 may pass through the first filter 170a so as to be incident on the optical waveguide 120, and may travel in the optical waveguide 120.

While traveling in the optical waveguide 120, the laser light of the second wavelength λ2 may pass under the second and third filters 170b and 170c. Since the laser light of the second wavelength λ2 is reflected by the second and third filters 170b and 170c, the laser light of the second wavelength λ2 may not be emitted above the second prism 150b after passing through the second filter 170b, and may not be emitted above the third prism 150c after passing through the third filter 170c. The laser light of the second wavelength λ2 that has passed under the second and third filters 170b and 170c along the optical waveguide 120 may be emitted above the fourth prism 150d after passing through the fourth filter 170d.

The laser light of the third wavelength λ3 emitted from the second light source 200b may sequentially pass through the second filter 170b, the optical waveguide 120, and the third filter 170c, and may be emitted above the third prism 150c.

As described above, since the first to fourth filters 170a, 170b, 170c, and 170d are provided under the first and second light sources 200a and 200b and the first and second detectors 300a and 300b, a path of laser light may vary with a wavelength.

Figure 9:
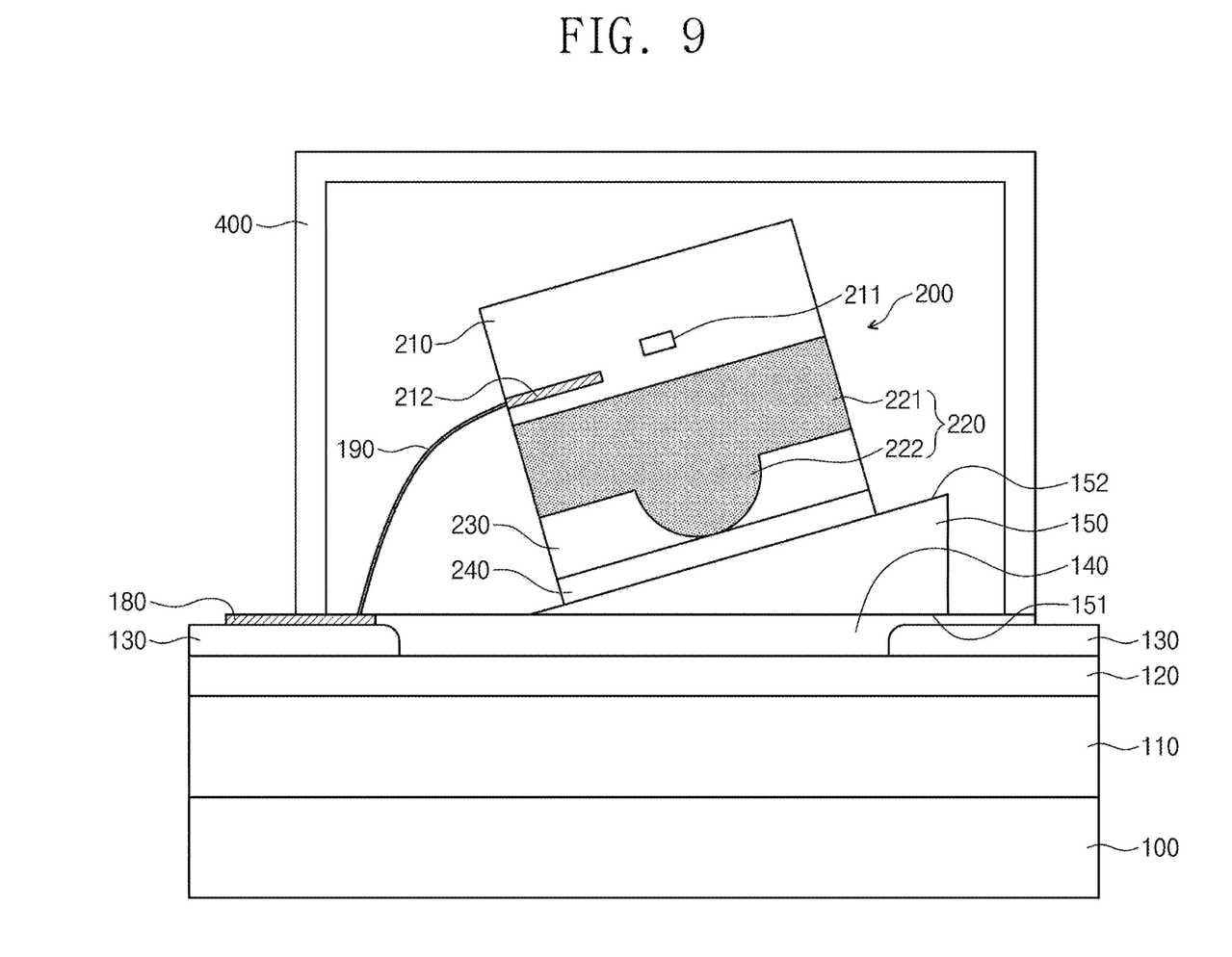
FIG. 9 is a cross-sectional view of an optical module according to an embodiment of the inventive concept.

FIG. 9 is a cross-sectional view of an optical module according to an embodiment of the inventive concept. The optical module according to the present embodiment is different from the optical module of FIG. 3 as described below, but is otherwise similar to the optical module of FIG. 3.

Referring to FIG. 9, the optical module may further include a connection electrode 180, a wire 190, and a case 400. The connection electrode 180 may be provided on the upper clad layer 130. The connection electrode 180 on the upper clad layer 130 may be in contact with the buffer layer 140. An upper surface of the connection electrode 180 and the upper surface of the buffer layer 140 may be coplanar. Although not illustrated, the connection electrode 180 may be electrically connected to an external electric circuit.

The light generation part 210 of the light source 200 may further include an inner electrode 212. The inner electrode 212 and the connection electrode 180 may be electrically connected by the wire 190.

The case 400 may include an empty space therein. The light source 200, the prism 150, and the wire 190 may be accommodated in the empty space. In other words, the light source 200, the prism 150, and the wire 190 may be sealed by the case 400. The light source 200, the prism 150, and the wire 190 may be protected from an external force due to the case 400. A first part of the case 400 may be in contact with the upper surface of the buffer layer 140. A second part of the case 400 may be in contact with an upper surface of the connection electrode 180. The connection electrode 180 may be provided between the case 400 and the upper clad layer 130 so as to connect the empty space in the case 400 and an external space.

In an optical module and an optical communication network system having the same according to embodiments of the inventive concept, a light source includes a lens, and thus parallel light may be emitted from the light source.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An optical module comprising:
   a substrate;
   an optical waveguide on the substrate;
   a light source configured to provide light into the optical waveguide; and
   a prism between the light source and the optical waveguide,
   wherein the light source comprises a lens, and
   wherein the lens comprises a base part having a shape of a flat plate and a semispherical protrusion part protruding from the base part toward the prism.

2. The optical module of claim 1, further comprising a light transmission part arranged on an inclined plane of the prism,
   wherein the light source is arranged such that the light provided by the light source is perpendicularly incident on an inclined plane of the prism after passing through the light transmission part as parallel light.

3. The optical module of claim 1, wherein the light source comprises an adhesive layer covering the lens and a light transmission part on the adhesive layer.

4. The optical module of claim 3, wherein a refractive index of the lens is about 1.55 to about 2.5, and a refractive index of the adhesive layer is about 1.3 to about 1.55.

5. The optical module of claim 1,
   wherein the light source further comprises a light generation part configured to emit light toward the lens,
   wherein the lens satisfies Equation (1) below:

$$F \cdot \tan(\tfrac{1}{2} \cdot \theta 2) < R \quad (1)$$

(where F denotes a focal distance of the lens, θ2 denotes a radiation angle of the light emitted from the light generation part, and R denotes a radius of the lens).

6. The optical module of claim 1, wherein a radius of the lens is about 1 μm to about 100 μm.

7. The optical module of claim 1, wherein the lens comprises at least one of SiC, GaN, $Si_3N_4$, TiN, $LiNbO_3$, $TiO_2$, ZnSe, or polyimide.

8. The optical module of claim 1, further comprising an anti-reflection film covering a lower surface and an inclined plane of the prism.

9. The optical module of claim 1, wherein the light that has passed through the lens is parallel light.

10. An optical module comprising:
    a substrate;
    an optical waveguide on the substrate;
    a filter on the optical waveguide;
    a prism on the filter; and
    a light source on an inclined plane of the prism.

11. The optical module of claim 10, wherein the filter is a wavelength division multiplexing filter.

12. The optical module of claim 10, wherein the filter comprises an upper mirror, a lower mirror, and a spacer between the upper mirror and the lower mirror.

13. The optical module of claim 12, wherein a length of a path through which light emitted from the light source passes in the upper mirror, a length of a path through which the light passes in the spacer, and a length of a path through which the light passes in the lower mirror are integer multiples of a half wavelength of the light.

14. The optical module of claim 12, wherein the upper mirror and the lower mirror are symmetric with respect to the spacer.

15. The optical module of claim 12, further comprising:
a buffer layer between the filter and the optical waveguide,
wherein the upper mirror comprises a first filter film which is in contact with the prism and a second filter film which is in contact with the spacer, and
the lower mirror comprises a third filter film which is in contact with the spacer and a fourth filter film which is in contact with the buffer layer,
wherein the first filter film and the fourth filter film have same thickness and refractive index, and
the second filter film and the third filter film have same thickness and refractive index.

16. The optical module of claim 15, wherein a refractive index of the spacer is equal to the refractive index of the first filter film.

17. An optical communication network system comprising:
a substrate having a sub control region, a connection region, and a sub unit cell region;
a first light source and a first detector in the sub control region;
a second light source and a second detector in the sub unit cell region;
a first optical waveguide connecting the first light source and the second detector and a second optical waveguide connecting the second light source and the first detector; and
a first prism between the first light source and the first optical waveguide and a second prism between the second light source and the second optical waveguide.

18. The optical communication network system of claim 17, further comprising a first filter between the first prism and the first optical waveguide and a second filter between the second prism and the second optical waveguide.

19. The optical communication network system of claim 17, further comprising anti-reflection films covering a lower surface and an inclined plane of each of the first and second prisms.

20. The optical communication network system of claim 17, wherein each of the first light source and the second light source comprises a lens.

* * * * *